Nov. 12, 1957  O. A. TYSON  2,813,250
PHASE MEASURING SYSTEM
Filed Aug. 21, 1953
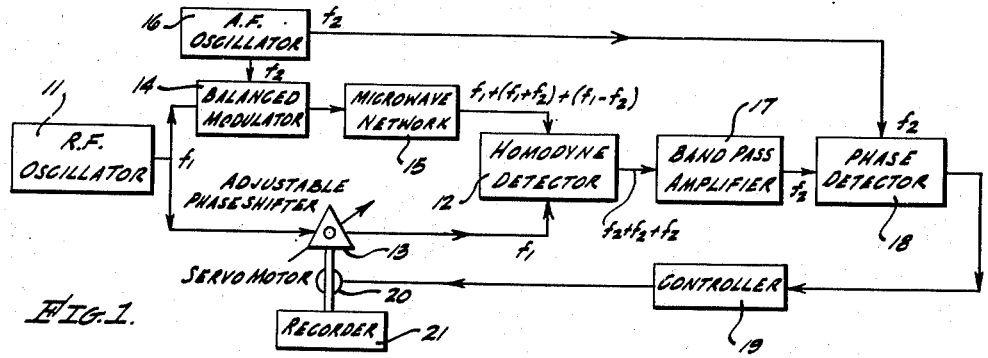
Fig. 1.
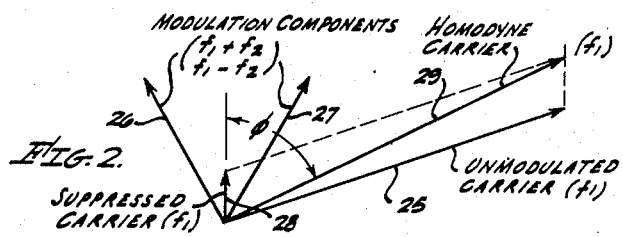
Fig. 2.
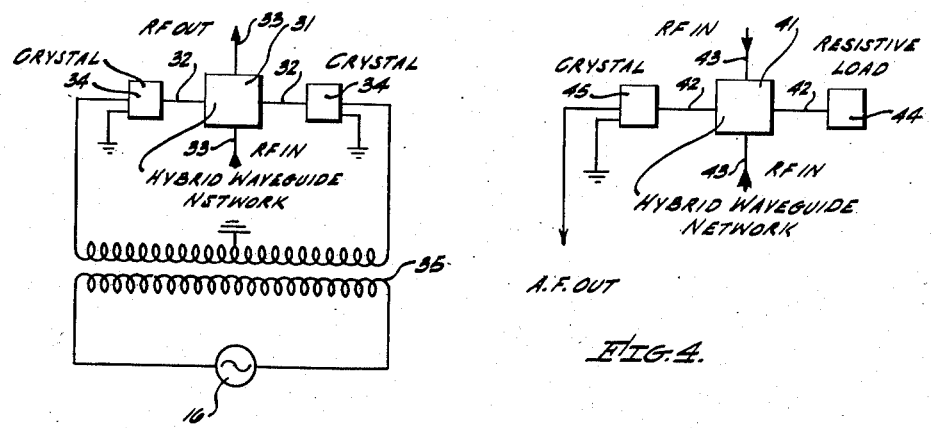
Fig. 3.
Fig. 4.
INVENTOR.
OWEN A. TYSON,
BY
HIS ATTORNEY.

United States Patent Office 2,813,250
Patented Nov. 12, 1957

2,813,250
PHASE MEASURING SYSTEM

Owen A. Tyson, Pacific Palisades, Calif., assignor, by mesne assignments, to Hughes Aircraft Company, a corporation of Delaware Application August 21, 1953, Serial No. 375,771

3 Claims. (Cl. 324—58)

This invention relates generally to wave transmission and, more particularly, to a system for measuring the phase of electromagnetic waves at microwave frequencies.

In the development of microwave components, phase measurements having a relatively high degree of accuracy are often required. Conventionally, such measurements are obtained by comparing the phase of a carrier wave of unknown phase with the phase of a reference carrier wave. So long as the magnitudes of both waves remain substantially constant, satisfactory results may be obtained in this way. When either or both of the carrier waves vary in amplitude, however, the accuracy of a phase measuring system of this general type is usually impaired. This problem is particularly acute in the measurement of the phase patterns of a microwave antenna, for example. The phase measuring system according to this invention, on the other hand, utilizes the principle of homodyne detection in order to provide more accurate indications of the phase of microwaves, even though their amplitudes may vary over a relatively wide range.

As is well known, the homodyne principle involves the summation and detection of an amplitude modulated wave having its carrier suppressed, and an unmodulated wave of like frequency. That is to say, an unmodulated wave and the side bands or modulation components of an amplitude modulated wave having the same frequency are combined in a detector to reproduce the modulation signal; the amplitude and phase of the modulation signal being dependent on the phase relation between the unmodulated wave and the vector sum of the modulation components. In particular, when the vector representing the sum of the modulation components is either 90° or 270° out of phase with respect to the vector representing the unmodulated carrier, no modulation signal is reproduced. In other words, a true null is obtained with respect to the modulation signal. Contrariwise, when the vector representing the sum of the modulation components is either in phase or 180° out of phase with respect to the vector representing the unmodulated carrier, the modulation signal is a maximum.

The phase measuring system of this invention is adapted to maintain the 90° or 270° phase relation or null position by controlling the phase of the unmodulated carrier wave. In so doing, the phase of the vector representing the sum of the modulation components may be readily determined with respect to the phase of the unmodulated carrier wave prior to its change. To make this determination, means are provided for indicating the amount which the phase of the unmodulated carrier wave has been shifted in order to maintain the null. Since the null position is dependent on phase relations only, it is seen that the phase measuring system of this invention is substantially insensitive to amplitude changes of either the unmodulated carrier wave or the modulation components whose phase is to be determined.

It is an object of this invention, therefore, to provide a phase measuring system utilizing the homodyne principle.

It is another object of this invention to provide a phase measuring system, the accuracy of which is substantially unaffected by changes in the amplitudes of the wave whose phase is to be determined and the wave whose phase is used for a reference.

It is a further object of this invention to utilize the principle of homodyne detection in a manner to provide a system for automatically recording the phase of microwaves with improved accuracy.

The novel features of this invention, together with further objects and advantages thereof, will be better understood when considered in connection with the accompanying drawings in which:

Fig. 1 is a block diagram of the phase measuring system in accordance with this invention;

Fig. 2 is a vector diagram showing the amplitude and phase relations of the waves supplied to the homodyne detector of Fig. 1;

Fig. 3 is a schematic diagram of the balanced modulator of Fig. 1; and

Fig. 4 is a schematic diagram of the homodyne detector shown in Fig. 1.

Referring to the drawing wherein like elements are designated by the same reference characters and particularly to Fig. 1 there is provided a radio frequency (R. F.) oscillator 11 which transmits microwaves to the respective input circuits of a homodyne detector 12 by way of two channels, namely, a measurement channel and a reference channel. In the reference channel an adjustable phase shifter 13 controls the phase of the microwaves transmitted to one of the input circuits of homodyne detector 12. The measurement channel, on the other hand, includes a balanced modulator 14 and microwave component or network 15, which produces the phase shift to be measured, connected between R. F. oscillator 11 and the other input circuit of homodyne detector 12. Also connected to balanced modulator 14 is an audio-frequency (A. F.) oscillator 16 which impresses on balanced modulator 14 a modulation signal. This modulation signal is detected by homodyne detector 12 and in turn selected and amplified by a bandpass amplifier 17. The amplified modulation signal is then combined in a phase detector 18 with a portion of the modulation signal obtained directly from A. F. oscillator 16. Phase detector 18 derives a direct current (D. C.) error voltage representative in magnitude and polarity of the amplitude and phase of the modulation signal which is itself representative of the amount and sense of the phase shift introduced by network 15. The error voltage from phase detector 18 is supplied to a controller 19 which generates a control signal suitable for controlling a servo motor 20 connected thereto. Finally servo motor 20 is mechanically coupled to an adjustable phase shifter 13 and to a recorder 21 which provides a visual indication of the phase shift to be measured.

Fig. 3 shows one conventional type of balanced modulator 14 suitable for use at microwave frequencies, including a hybrid waveguide network 31 having two pairs of conjugate arms 32 and 33, a first of the arms 33 being supplied with microwaves from R. F. oscillator 11. These microwaves are modulated with the modulation signal generated by A. F. oscillator 16 by means of crystals 34 terminating the respective conjugate arms 32. Crystals 34 are fed in a reverse phase relation by A. F. oscillator 16 owing to the manner of interconnection utilized. As is shown schematically, A. F. oscillator 16 and crystals 34 are interconnected by a center-tapped transformer 35 having its primary winding energized by A. F. oscillator 16. The secondary winding of transformer 35 is connected at one of its ends to one of the crystals 34, and at the other of its ends to the other of crystals 34. To complete the circuit, crystals 34 are grounded as is the center tap of transformer 35. Accordingly, at the output end of the second of arms 33 there appears a modulated wave wherein the carrier is suppressed.

Fig. 4 shows the homodyne detector 12 which includes a hybrid waveguide network 41 having two pairs of conjugate arms 42 and 43. Arms 43, which constitute the respective input circuits of homodyne detector 12, are supplied with the modulation components and the unmodulated carrier wave, respectively, having been transmitted through the measurement channel and the reference channel. Terminating a first of the arms 42 is a resistive load 44 for absorbing the R. F. signal appearing in this arm and comprising what may be considered as the difference of the modulation components and the carrier wave. Terminating the second of arms 42 is a crystal 45 for demodulating the R. F. signal appearing in this arm and comprising what then may be defined as the sum of the modulation components and the carrier wave. Finally, the output signal from crystal 45 which constitutes the output circuit of homodyne detector 12 is applied to bandpass amplifier 17 as shown in Fig. 1.

The operation of the system may be readily understood with reference to Fig. 2 wherein the waves impressed on homodyne detector 12 are shown vectorially. Thus, the carrier wave generated by R. F. oscillator 11 and transmitted through adjustable phase shifter 13 to one of the input circuits of homodyne detector 12 is represented by vector 25. Similarly, the modulation components produced by balanced modulator 14 and transmitted through phase shifting network 15 to the other input circuit of homodyne detector 12 are represented by vectors 26 and 27. Since it is very difficult in practice to completely suppress the carrier of a modulated wave at microwave frequencies, a partially suppressed carrier 28 associated with modulation components 26, 27 is represented by vector 28. As is well known, vectors 26, 27 representing the modulation components or side bands may be regarded as counter-rotating with respect to suppressed carrier vector 28, owing to the fact that the respective frequencies of the modulation components are equal to the sum and difference of the suppressed carrier wave frequency and the A. F. modulating frequency, respectively.

Accordingly, the sum of the vectors 25, 26, 27, 28, as is produced in homodyne detector 12, yields a resultant or homodyne carrier 29 in combination with modulation components 26, 27. This result is shown mathematically in the following equation:

$$E_{(t)} = E_h \cos(\omega_1 t + \phi) + E_m \cos(\omega_1 + \omega_2)t + E_m \cos(\omega_1 - \omega_e)t$$

wherein:

$t$ = time
$\omega_1$ = angular frequency of homodyne carrier
$\omega_2$ = angular frequency of modulation signal
$\phi$ = phase angle between suppressed carrier and unmodulated carrier
$E_{(t)}$ = sum of homodyne carrier voltage and modulation component voltages as a function of time
$E_h$ = peak voltage of homodyne carrier
$E_m$ = peak voltage of modulation components Although the operation of the homodyne detector would be basically the same irrespective of the characteristics of the non linear detection device utilized, for simplicity of mathematical expression, the crystal utilized in homodyne detector 12 may be regarded as a square-law detector. The output signal therefrom may then be represented by the following additional equation:

$$i_{(t)} = a_2 E_{(t)}^2$$
$$= a_2 \{½E_h^2[1 + \cos(2\omega_1 t + 2\phi)] + ½E_m^2[1 + \cos(2\omega_1 + 2\omega_2)t] + ½E_m^2[1 + \cos(2\omega_1 - 2\omega_2)t] + ½E_m^2[\cos(2\omega_2 t) + \cos(2\omega_1 t)] + ½E_h E_m[2 \cos(\omega_2 t) \cos\phi - \cos(2\omega_1 + \omega_2 t + \phi) - \cos(2\omega_1 t - \omega_2 t + \phi)]\}$$

wherein:

$i_{(t)}$ = detector current as a function of time
$a_2$ = a constant

As seen from this equation, the modulation signal component reproduced by homodyne detector 12 is a maximum when $\phi$ equals 0° or 180° and falls to zero when $\phi$ equals 90° or 270°. Since the phase of the homodyne carrier 29 is very nearly the same as the phase of the unmodulated carrier 25, the null produced in the latter case is substantially a function of phase relations only. It is also important to observe that the phase of the modulation signal component reverses on either side of the nulls. For example, the modulating signal component reproduced by homodyne detector 12 when $\phi$ is less than 90° will have a phase which is exactly opposite to its phase when $\phi$ has a value between 90° and 180°.

The modulation signal component from homodyne detector 12 is amplified by bandpass amplifier 17 to the exclusion of other components. By comparing in phase detector 18 the phase and amplitude of the reproduced modulation signal and the phase and amplitude of the modulation signal derived directly from A. F. oscillator 16, a D. C. error voltage is derived which reflects the phase difference between the unmodulated carrier wave and the suppressed carrier modulated wave. In particular, the amplitude of this error voltage is representative of the amount of the phase difference between the modulated and unmodulated waves; and the polarity of the error voltage indicates the sense of the deviation from either the 90° or 270° null producing phase relations. The error voltage derived by phase detector 18 then is applied to controller 19, which, in turn, provides a control signal suitable for actuating servomotor 20.

The function of servomotor 20 may be best described by assuming that network 15 introduces a phase shift which tends to destroy a null having been established during a previous measurement. This would be the case, where a series of phase measurements are being made in order to determine the phase shift of a network as a function of frequency, for example. Accordingly, phase detector 18 derives a D. C. voltage having a magnitude and polarity representative of the amount and sense of the phase shift introduced. As a result, controller 19 generates a control signal in accordance with the D. C. voltage for actuating servomotor 20. Servomotor 20, in turn, readjusts phase shifter 13 by virtue of its mechanical connection thereto in a manner to re-establish the null. Provided that phase shifter 13 is calibrated, the magnitude and sense of the readjustment or phase shift may be readily determined with reference to recorder 21, which also is mechanically coupled to servomotor 20. As is apparent, the phase shift produced by phase shifter 13 in response to servomotor 20 is equal to the original phase shift introduced by network 15.

Although adjustable phase shifter 13 has been placed in the reference channel, the operation of the system would remain unchanged, were it relocated in the measurement channel. Similarly, a modulation signal having a frequency which exceeds the audio range may be preferable in some applications. It is obvious that other modifications of a similar nature may be made without exceeding the spirit and scope of this invention.

What is claimed is:

1. In a phase measuring system for determining an unknown phase shift introduced by a microwave network, the system including an oscillator for generating carrier wave energy, a balanced modulator for modulating a portion of said carrier wave energy and for suppressing said portion of energy relative to the modulation components, an adjustable phase shifter controllable by a servomotor, a homodyne detector adapted to provide an output signal characteristic of the unknown phase shift, and a low frequency oscillator coupled to the balanced modulator, the combination therewith of a servo control loop for automatically causing said adjustable phase shifter to produce a phase shift representative of the unknown phase shift introduced by said microwave network, said control loop comprising: a phase detecting means coupled to the output of the homodyne detector and to the low frequency oscillator and being adapted to provide a D.-C. signal uniquely representative of the phase difference between the output signal of said homodyne detector and the output signal of said low frequency oscillator; controller means coupled to said phase detector and being adapted to provide a control signal in response to said D.-C. signal; motor means electrically coupled to said control means and mechanically coupled to said adjustable phase shifter, said motor means being adapted to provide torque for actuating said phase shifter in response to said control signal.

2. In a phase measuring system for determining an unknown phase shift introduced by a microwave network, the system including an oscillator for generating carrier wave energy, a balanced modulator for modulating a portion of said carrier wave energy and for suppressing said portion of energy relative to the modulation components, an adjustable phase shifter controllable by a servomotor, a homodyne detector adapted to provide an output signal characteristic of the unknown phase shift and a low frequency oscillator coupled to the balanced modulator, the combination therewith of a servo control loop for automatically causing the adjustable phase shifter to produce a phase shift having a magnitude representative of the unknown phase shift introduced by the microwave network, said control loop comprising: a bandpass amplifier coupled to the output of the homodyne detector and adapted to select and amplify signals of the frequency of the low frequency oscillator; a phase detector coupled to said bandpass amplifier and to said low frequency oscillator, said phase detector being adapted to compare phase-wise the signals from said amplifier with the signals from said low frequency oscillator and to derive from said phase comparison a D.-C. signal whose magnitude and sense are representative of the phase shift introduced by said microwave network; a controller coupled to said phase detector and adapted to provide a control signal responsive to said D.-C. signal; and a servomotor coupled to said controller and adapted to be actuated by said control signal, said servo motor being mcehanically coupled to said adjustable phase shifter to adjust the phase shifter in response to said control signal.

3. In a phase measuring system for determining the phase shift introduced by a microwave network, the system including an R. F. oscillator, the output energy of which is divided into first and second paths to a homodyne detector of the character adapted to detect microwave frequencies, the first path including a balanced modulator and a low frequency oscillator having first and second output terminals, the first terminal being coupled to the balanced modulator, the modulator being adapted to modulate the carrier waves in the first path such as to suppress the carrier wave component relative to the modulation components, the second path including an adjustable phase shifter of the character adapted to be actuated by a servo motor, and means coupled to the output of said homodyne detector and responsive to the signal detected thereby for operating said adjustable phase shifter in a manner such that the magnitude of phase shift achieved in said adjustable phase shifter is representative of the phase shift of said microwave network, said means comprising: a bandpass amplifier coupled to the output of the homodyne detector and adapted to select and amplify signals of the frequency of the low frequency oscillator; a phase detector coupled to said bandpass amplifier and to the second output terminal of the low frequency oscillator, said phase detector being adapted to compare phase-wise the signals from said amplifier with the signals from said low frequency oscillator, and to derive from said phase comparison a D.-C. signal whose magnitude and sense are representative of the phase shift introduced by the microwave network, a controller coupled to said phase detector and adapted to provide a control signal in response to said D.-C. signal, and a servo motor coupled to said controller and adapted to be actuated by said control signal, said servo motor being mechanically coupled to said adjustable phase shifter in a manner to adjust said phase shifter to provide a phase shift representative of the phase shift of said microwave network.

References Cited in the file of this patent
UNITED STATES PATENTS

| | | |
|---|---|---|
| 2,416,310 | Hansen | Feb. 25, 1947 |
| 2,452,587 | McCoy | Nov. 2, 1948 |
| 2,595,263 | Ingalls | May 6, 1952 |
| 2,596,288 | Robertson | May 13, 1952 |